United States Patent
Billiet

(10) Patent No.: US 9,844,749 B2
(45) Date of Patent: Dec. 19, 2017

(54) PRESSURE SWING ADSORPTION APPARATUS

(71) Applicant: Nano-Porous Solutions Limited, Tyne and Wear (GB)

(72) Inventor: Colin Billiet, Tyne and Wear (GB)

(73) Assignee: NORGREN LIMITED (GB)

( * ) Notice: Subject to any disclaimer, the term of this patent is extended or adjusted under 35 U.S.C. 154(b) by 0 days.

(21) Appl. No.: 14/440,496

(22) PCT Filed: Oct. 24, 2013

(86) PCT No.: PCT/GB2013/052780
§ 371 (c)(1),
(2) Date: May 4, 2015

(87) PCT Pub. No.: WO2014/068287
PCT Pub. Date: May 8, 2014

(65) Prior Publication Data
US 2015/0298045 A1    Oct. 22, 2015

(30) Foreign Application Priority Data
Nov. 5, 2012  (GB) .................................. 1219842.0

(51) Int. Cl.
*B01D 53/047*   (2006.01)
*B01J 20/28*    (2006.01)
*B01J 20/08*    (2006.01)
*B01J 20/18*    (2006.01)
*B01J 20/20*    (2006.01)
B01D 53/26      (2006.01)

(52) U.S. Cl.
CPC ............ *B01D 53/047* (2013.01); *B01J 20/08* (2013.01); *B01J 20/18* (2013.01); *B01J 20/20* (2013.01);
(Continued)

(58) Field of Classification Search
CPC .. B01D 53/047; B01D 53/261; B01D 53/263; B01D 2253/116; B01D 2253/202;
(Continued)

(56) References Cited

U.S. PATENT DOCUMENTS 5,288,306 A * 2/1994 Aibe ................. B01D 53/02
                                                 95/141
6,190,441 B1 * 2/2001 Czabala ............. B01D 53/0446
                                                 96/130
(Continued)

FOREIGN PATENT DOCUMENTS

GB    2042365    9/1980
GB    2336325    10/1999
(Continued)

OTHER PUBLICATIONS

Corresponding International Search Report for PCT/GB2013/052780 dated Nov. 27, 2013. WO.
(Continued)

*Primary Examiner* — Frank Lawrence
(74) *Attorney, Agent, or Firm* — The Belles Group, P.C.

(57) ABSTRACT

A pressure swing adsorption apparatus for the removal of one or more components such as oxygen from a mixture of gases such as air is disclosed. The apparatus includes pairs of columns (14, 16) for receiving a stream of compressed air with one column operating in a working mode whilst the other said column operates in a purging mode. The columns contain carbon molecular sieve material (26) for adsorbing oxygen and a desiccant material formed into a plurality of tubes (28).

17 Claims, 4 Drawing Sheets

(52) U.S. Cl.
CPC ..... *B01J 20/2803* (2013.01); *B01J 20/28042* (2013.01); *B01D 53/263* (2013.01); *B01D 2253/116* (2013.01); *B01D 2253/202* (2013.01); *B01D 2253/342* (2013.01); *B01D 2256/10* (2013.01); *B01D 2257/104* (2013.01); *B01D 2257/80* (2013.01); *B01D 2259/414* (2013.01); *B01D 2259/4145* (2013.01)

(58) Field of Classification Search
CPC .......... B01D 2253/342; B01D 2256/10; B01D 2257/104; B01D 2257/80; B01D 2259/414; B01D 2259/4145; B01J 20/08; B01J 20/18; B01J 20/20; B01J 20/2803; B01J 20/28042
USPC .................................................. 96/121, 132
See application file for complete search history.

(56) References Cited

U.S. PATENT DOCUMENTS

| | | | |
|---|---|---|---|
| 6,206,675 B1 | 3/2001 | Bevier | |
| 6,364,936 B1 | 4/2002 | Rood et al. | |
| 6,458,187 B1 | 10/2002 | Fritz et al. | |
| 7,462,224 B2 * | 12/2008 | Wolff | B01D 53/0407 123/519 |
| 7,763,102 B2 * | 7/2010 | Lomax, Jr. | B01D 53/0407 96/121 |
| 2001/0014707 A1 * | 8/2001 | Thomas | B01D 15/00 524/35 |
| 2005/0005771 A1 * | 1/2005 | Lomax, Jr. | B01D 53/0446 96/121 |
| 2009/0178566 A1 | 7/2009 | Tschantz et al. | |
| 2010/0239512 A1 | 9/2010 | Morris et al. | |
| 2010/0300288 A1 * | 12/2010 | Boulet | B01D 53/0473 95/96 |
| 2010/0316538 A1 * | 12/2010 | Buelow | B01J 20/103 422/177 |

FOREIGN PATENT DOCUMENTS

| | | |
|---|---|---|
| WO | 9833579 | 8/1998 |
| WO | 2009053760 | 4/2009 |

OTHER PUBLICATIONS

Corresponding Search Report for GB 2507557 dated Aug. 22, 2013. GB.

* cited by examiner

PRESSURE SWING ADSORPTION APPARATUS

CROSS-REFERENCE TO RELATED PATENT APPLICATIONS

The present application is a U.S. national stage application under 35 U.S.C. § 371 of PCT Application No. PCT/GB2013/052780, filed Oct. 24, 2013, which in turn claims priority to U.K. Application No. 1219842.0, filed Nov. 5, 2012, the entireties of which are incorporated herein by reference.

The present invention relates to a pressure swing adsorption apparatus and relates particularly, but not exclusively, to a multi-column pressure swing adsorption system for the production of Nitrogen gas.

The production of nitrogen gas from a compressed air source is well known. Employing selected Carbon Molecular Sieve (CMS) and utilising Pressure Swing Adsorption (PSA) technology enables the supply of various purities of nitrogen to be produced by the user on site.

The purity of the compressed air supply is an important consideration since it is unsuitable for use without treatment to improve its purity. Compressed air contains contaminants such as water, oil and particulate which must be removed before use. Treating compressed air has generally involved filtering it, to remove oil/water aerosols and dirt, and drying it to remove water vapour. Its purity has an effect on the operation of PSA nitrogen generators.

With reference to FIG. 1, a twin tower dryer PSA nitrogen generator operates by removing oxygen through molecular adsorption onto a bed of granular CMS from the feed air (typically at 7-10 barg) as it flows up through a packed bed of CMS, column A. Column B (having been previously used) is depressurised and oxygen released from the CMS due to the expansion of the gas within the bed. Dry purge gas from the outlet of column A is fed through a control orifice, expanded to near atmospheric pressure, and flowed in contra flow direction down through column B to sweep the bed of concentrated oxygen. The cycle of operation is set to achieve the desired output purity of the nitrogen outlet stream. When the CMS in column A becomes saturated with oxygen (usually determined by a simple timer controller) the feed air is switched back to column B, after it has been pressurised, and the cycle continues producing a stream of nitrogen gas (oxygen depleted air).

Fast gases (that is easily adsorbed gases such as water vapour and $CO_2$) are, along with the Oxygen, diffuse into the porous structure of the CMS. The water vapour content of a gas stream is significant and its presence will affect the efficiency of the nitrogen generation process (see U.S. Pat. No. 4,439,213). It has been recognised that the treatment of the inlet compressed air is therefore an important consideration.

Suppliers of PSA nitrogen generators recommend various levels of dryness. Generally the dryer the compressed air is the better it is for the CMS.

At 25° C. (77° F.) and 7 bar the water vapour content in compressed air is 2,875 mg/m3
At 10° C. (50° F.) pressure dew point and 7 bar (typically achieved using a refrigerated air dryer) the water vapour content in compressed air is 1,175 mg/m3.
At -25° C. (-13° F.) pressure dew point and 7 bar (achieved using desiccant air dryers the water vapour content in compressed air is 75 mg/m3.

Desiccant dryers are preferred due to the low residual water vapour content produced to achieve the best efficiency for a nitrogen generator. However, their requirement for regeneration air (during a purge cycle), at typically 20% of the inlet air, results in a need for a much larger compressor which increases capital and running costs. Some suppliers therefore use refrigerated dryers but limit their warranty on the nitrogen generator. Generally it is assumed that for high nitrogen purities (10-500 ppm of oxygen) high purity inlet air is most important.

It is common practice on some small systems (e.g. delivering 5 liters/minute) to integrate a desiccant drying stage into the adsorption beds and utilise the nitrogen generator purge for regeneration. Designers however must be aware of the limitations of such an approach.

Granular desiccant adsorbents are widely used to remove contaminants such as water vapour from gases including compressed air but the adsorbents have their limitations. The properties of such technologies are well defined and their use limited in certain applications. These limitations include orientation, vibration, high pressure loss, attrition, channelling, by-pass, high regeneration energy (purge) and poor resistance to bulk water and aerosols.

The irregular size and shape of the desiccant beads leads to attrition and channelling due to poor packing of the bed. The powdery appearance of the adsorbent beads indicates that dust is readily shed in use, contaminating the outlet air stream, thereby endangering downstream apparatus. The typical life expectancy of beads is 12,000 hours (that is less than 18 months of a continuous use).

Exposure to bulk water, where droplets of water get through a filter and enter the desiccant bed, is common and results in the breakdown of desiccant beads. This breakdown is for example due to the fact that the clay binder (bentonite) breaks down easily and washes away. Such conditions result when condensed water vapour is not adequately removed prior to the dryer.

Once this exposure occurs the entire adsorption bed needs to be replaced. The resultant dust washes through downstream with potential consequences.

Typically desiccant material has to be changed every 18 months of continuous use due to its limitations described above. This would be costly and disruptive to operators of nitrogen generation systems. It is not seen a practical proposition since it would require the removal of the CMS (typically 90% of the bed volume) to access the desiccant drying stage.

In small systems, such as beverage dispensers (delivering around 5 liters/minute), the life of the desiccant is aligned to that of the compressor which would typically have a life of ≤10,000 hours and duty is not continuous. The single column PSA module, complete with an integrated granular adsorbent stage, has a life aligned with the compressor.

For larger systems requiring continuous duty this is not a practicable solution. CMS is not normally considered to be subject to regular servicing (replacement) with an expected life of 10 years assuming a high standard of inlet air purity. So in this case the service life of desiccant beaded material is not aligned with the life of the CMS or the industrial grade of compressor used. Should the air treatment system malfunction and bulk water come into contact with the desiccant material it would be damaged and require replacement, an unacceptable scenario to users.

Preferred embodiments of the present invention seek to overcome the above described disadvantages of the prior art.

According to the present invention there is provided a pressure swing adsorption apparatus for the removal of at least one component from a mixture of gases, the apparatus comprising a plurality of columns for receiving a stream of gas, at least one said column adapted to operating in a working mode whilst at least one other said column operates in a purging mode, a plurality of said columns containing at least one carbon molecular sieve material for adsorbing at least one component of said of gas and at least one desiccant material formed into a plurality of tubes.

By using a tubular desiccant material within a column that also contains the carbon molecular sieve material, the advantage is provided that the desiccant material does not break down as seen in systems of the prior art. As a result, the useful working life of the desiccant material is similar to that of the carbon molecular sieve and these two components can be combined into a single column. Because the desiccant drier is formed in the same column as the carbon molecular sieve (and is not a separate desiccant drier) there are significant savings in the operation of the system. In particular, the volume of treated gas that is required for the purge cycle of the carbon molecular sieve is unchanged but this purge gas also performs the regeneration of the drying stage eliminating the purge air losses of required for an external desiccant dryer (around 20% of the air from the compressor is required for purging the external desiccant dryer in the prior art). Because the expected working life of the tubular desiccant material has been increased the need to service the desiccant aligned to that of the CMS which is done by replacement of the CMS and drying stage after around 10 years.

In a preferred embodiment the columns are formed from extruded material.

In another preferred embodiment the carbon molecular sieve material is adapted to remove oxygen from said mixture of gases.

By removing oxygen from compressed air allows the production of nitrogen gas (oxygen depleted air).

In a preferred embodiment the desiccant material comprises adsorption crystals (e.g. molecular sieves or activated alumina).

In another preferred embodiment the desiccant material comprises at least one polymer binder.

In a further preferred embodiment the polymer binder comprises Polyether Sulphone.

By using a polymer binder and adsorption crystals, the advantage is provided that very small tubes can be formed having a very high surface area and thereby being provided with excellent desiccant properties for drying the compressed air. The polymer binder, and in particular polyethersulphone, produces tubes that are not prone to breakdown and dusting thereby protecting the carbon molecular sieve material and downstream equipment from the effects of dust. The adsorbent tubes are completely tolerant to water in either bulk or aerosol form and will fully recover operation from complete water saturation.

In a preferred embodiment the tubes typically have an external diameter in the range of 1-4 mm and preferably of 2.2 mm and an internal diameter in the range of 0.5-1 mm and preferably of 0.9 mm.

Preferred embodiments of the present invention will now be described, by way of example only, and not in any limitative sense, with reference to the accompanying drawings in which.

Figure 1:
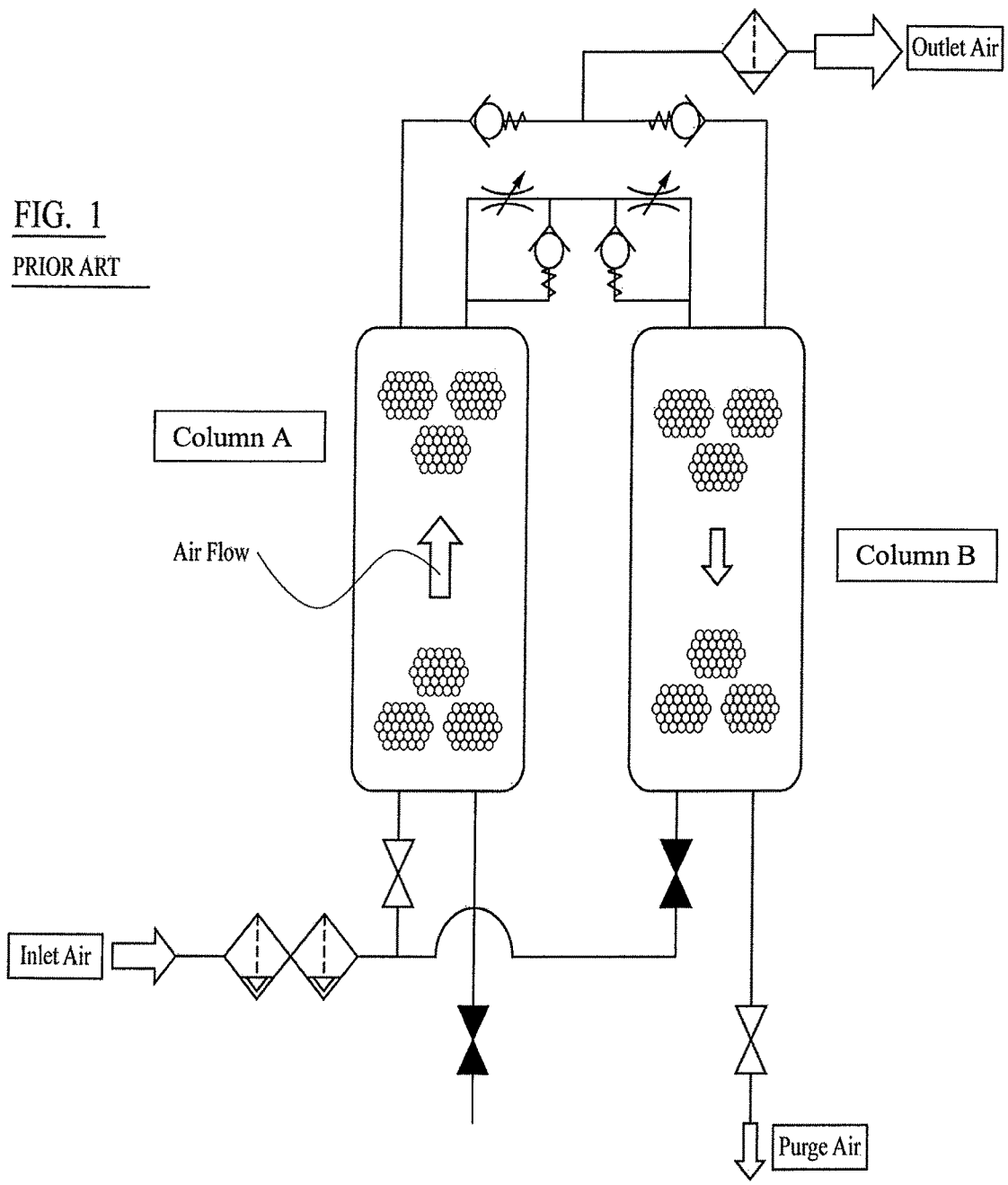
FIG. 1 is a schematic representation of a nitrogen generator of the prior art.
Figure 2:
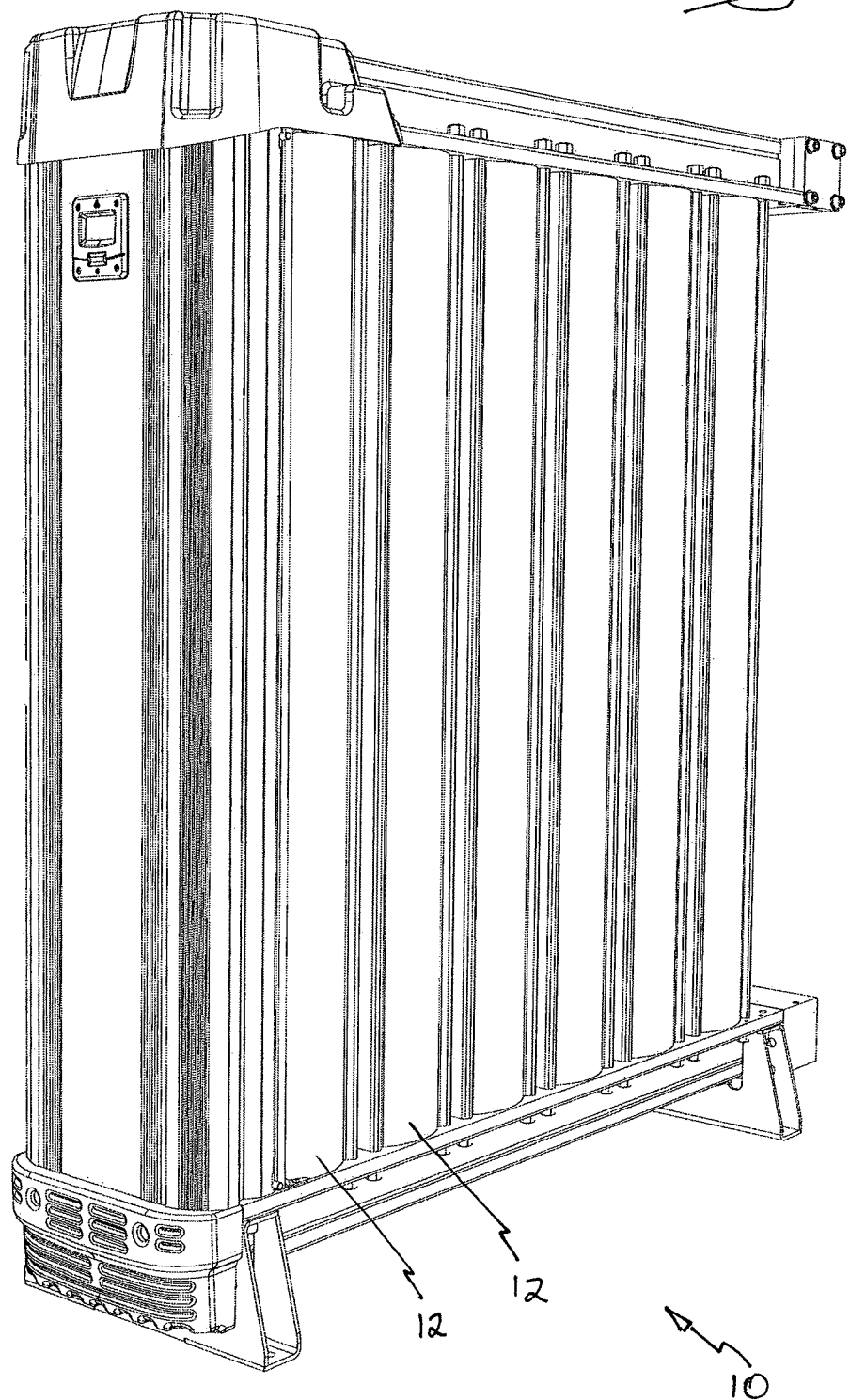
FIG. 2 is a perspective view of an apparatus of the present invention.
Figure 3:
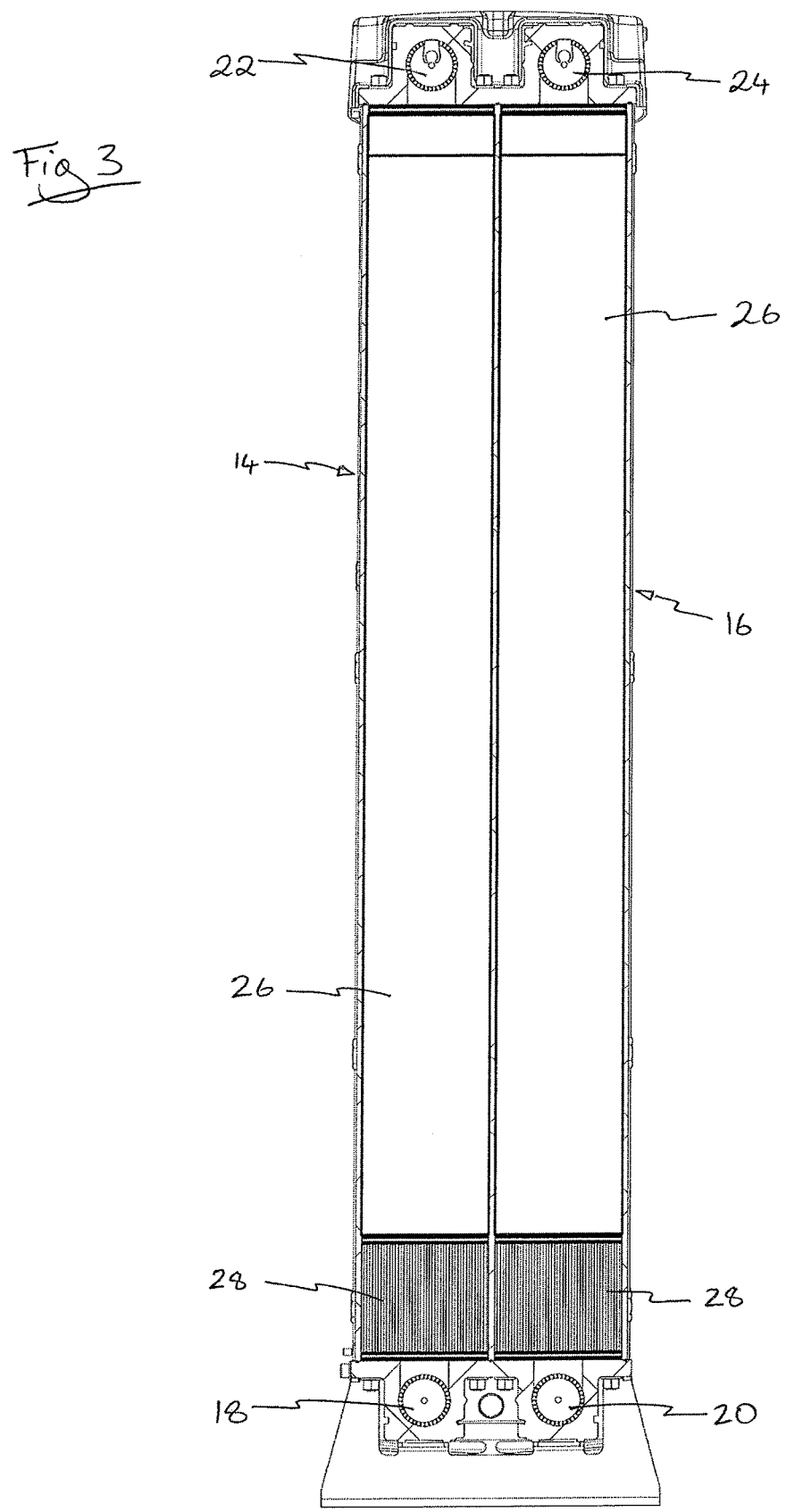
FIG. 3 is a sectional view of the apparatus of FIG. 2.
Figure 4:
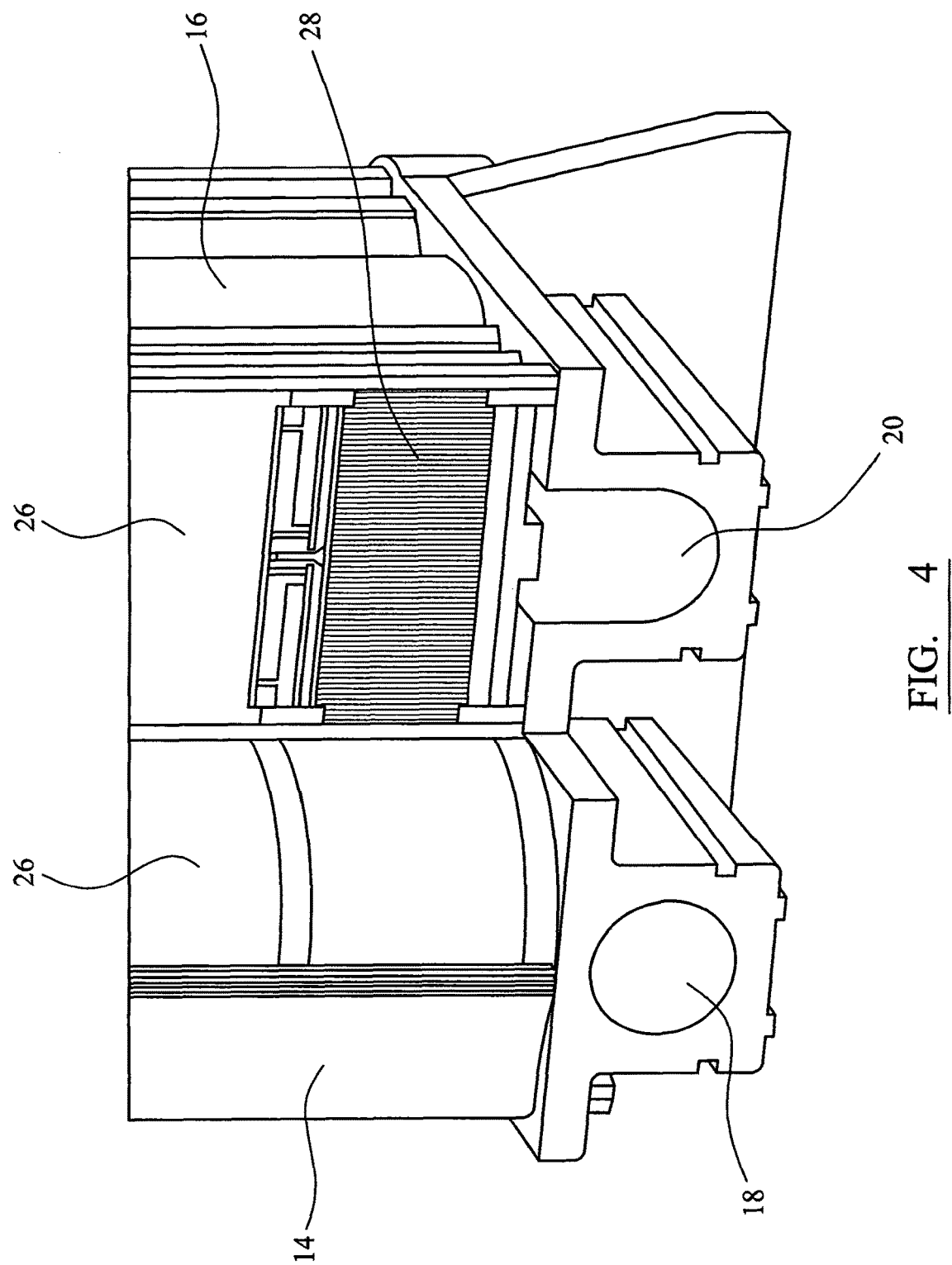
FIG. 4 is a sectional perspective view of a part of the apparatus of FIG. 2.

Referring to FIGS. 2 to 4 a pressure swing absorption apparatus 10, for the removal of at least one component from a mixture of gases in the example shown the removal of oxygen to produce nitrogen gas, has a series of pairs of columns 12. Each pair of columns includes a left column 14 and a right column 16 both of which are supplied with a stream of gas under pressure via respective inlet channels 18 and 20. Each column also has a respective outlet channel 22 and 24 and a series of valves (not shown) control the apparatus so that whilst the left hand columns 14, that are connected to each other by inlet and outlet channels 18 and 22, operate in a working mode the right hand columns, connected by inlet and outlet channels 20 and 24 operate in a purging mode. Each column 14, 16 contains at least one carbon molecular sieve material 26 for absorbing at least one component of the gas. Each column also contains a desiccant material 28.

The carbon molecular sieve material 26 absorbs a component of the gas, in this example oxygen, whilst the column is in a working mode and releases the oxygen when operating in a purge mode. Similarly, water vapour is absorbed and released from the desiccant material when the column is in the working and purge mode respectively. The desiccant material 28 is typically formed from adsorption crystals (for example molecular sieves or activated alumina) that are bound together with a polymer binder, for example Polyether Sulphone. The tubes are formed with an external diameter of around 2.2 mm and an internal diameter of around 0.9 mm although these dimensions may vary within the range of 1-4 mm external diameter and wall thicknesses of 0.5-1.0 mm. The tubes of desiccant material are aligned axially with the column and formed into a bundle with the external ends of the tubes optionally potted together thereby leaving the flow of compressed air travelling through the internal diameter of the tubes.

Each column 14, 16 has an internal volume of approximately 25 liters each and is designed to operate with an input flow of around 10-40 $Nm^3$/hour and an output volume of 1-20 $Nm^3$/hour. The system is scalable by the addition of further pairs of columns that are connected by the channels.

Operation of the pressure spring absorption nitrogen generating apparatus 10 of the present invention will now be described. Valves (not shown) at an inlet end of channel 18 are opened whilst further valves (also not shown) at an exhaust end of channel 18 are closed thereby allowing compressed air under pressure to enter columns 14 where it is initially dried by tubular desiccant material 28 before passing into the carbon molecular sieve material 26 in which oxygen is removed. The depleted oxygen (and therefore nitrogen enriched) air passes into channel 22, through an outlet valve (not shown) and onto use or storage in a pressurised vessel (also not shown).

At the same time column 16 (having previously been used) is being purged by nitrogen enriched and dried air being passed back through channel 22 and into column 16. The dry and nitrogen enriched air is at reduced pressure (compared to column 14) and is able to purge the oxygen from the carbon molecular sieve material 26 and order vapour from desiccant material 28 before passing through channel 20 in which the arrangement of valves has been reversed from the current valve positions in channel 18 so that the purged air can exhaust. After a predetermined period of time, and as the carbon molecular sieve material 26 and desiccant material 28 in column 14 become towards being saturated, the valves switch such that the column 14 switches to a purge mode and column 16 switches to an operating mode.

It will be appreciated by persons skilled in the art that the above embodiments have been described by way of example only and not in any limitative sense, and that various alterations and modifications are possible without departure from the scope of the invention as defined by the appended claims.

The invention claimed is:

1. A pressure swing adsorption apparatus for the removal of at least one component from a mixture of gases, the apparatus comprising a plurality of columns for receiving a stream of gas, at least one said column adapted to operating in a working mode whilst at least one other said column operates in a purging mode, said plurality of columns containing at least one carbon molecular sieve material for adsorbing at least one component of said of gas and at least one desiccant material, wherein said at least one desiccant material comprises at least one polymer binder, and wherein said at least one desiccant material is formed into a plurality of tubes, wherein the plurality of tubes are aligned axially with the column and formed into a bundle so that the stream of gas travels through the internal diameter of the plurality of tubes and wherein the polymer binder comprises polyether sulphone.

2. The apparatus according to claim 1, wherein said columns are formed from extruded material.

3. The apparatus according to claim 1, wherein said carbon molecular sieve material is adapted to remove oxygen from said mixture of gases.

4. The apparatus according to claim 1, wherein said desiccant material comprises adsorption crystals.

5. The apparatus according to claim 1, wherein said tubes have an external diameter of between 1 mm and 4 mm and an internal diameter of between 0.5 mm and 1 mm.

6. The apparatus according to claim 5, wherein said tubes have an external diameter of 2.2 mm and an internal diameter of 0.9 mm.

7. A pressure swing adsorption apparatus comprising a column, the column comprising:
    an input for receiving a stream of gas;
    an output;
    a plurality of tubes in direct fluid communication with the input, the plurality of tubes comprising a desiccant material and a polymer binder, the polymer binder comprising polyether sulphone; and
    a carbon molecular sieve in direct fluid communication with the output;
    wherein the plurality of tubes and the carbon molecular sieve are in direct fluid communication, and the plurality of tubes are aligned axially with the column and formed into a bundle so that the stream of gas travels the internal diameter of the plurality of tubes.

8. The apparatus according to claim 7, wherein each of the plurality of tubes have an external diameter of between 1 mm and 4 mm and an internal diameter of between 0.5 mm and 1 mm.

9. The apparatus according to claim 8, wherein each of the plurality of tubes have an external diameter of 2.2 mm and an internal diameter of 0.9 mm.

10. A pressure swing adsorption apparatus comprising a plurality of columns, wherein at least one of the plurality of columns comprises:
    a carbon molecular sieve material; and
    a plurality of tubes comprising a desiccant material, the desiccant material comprising adsorption crystals and a polymer binder comprising polyether sulphone, and the plurality of tubes are aligned axially with the column and formed into a bundle so that the stream of gas travels the internal diameter of the plurality of tubes.

11. The apparatus according to claim 10, wherein each of the plurality of tubes have an external diameter of between 1 mm and 4 mm and an internal diameter of between 0.5 mm and 1 mm.

12. The apparatus according to claim 11, wherein each of the plurality of tubes have an external diameter of 2.2 mm and an internal diameter of 0.9 mm.

13. The apparatus according to claim 7, wherein the apparatus further comprises a top support structure and a bottom support structure, and the column comprises a top portion opposite a bottom portion; and
    wherein the top portion of the column is supported by the top support structure and the bottom portion of the column is support by the bottom support structure, and wherein the input is located at the bottom portion of the column and the output is located at the top portion of the column.

14. The apparatus according to claim 13, wherein the plurality of tubes are located in the bottom portion of the column and the carbon molecular sieve is located above the plurality of tubes.

15. The apparatus of claim 7, wherein the apparatus comprises a plurality of the columns organized in pairs that form an array extending along a direction that is substantially perpendicular to the axial alignment of each column.

16. The apparatus according to claim 10, wherein the apparatus further comprises a top support structure and a bottom support structure, and each of the plurality of columns comprises a top portion opposite a bottom portion;
    wherein the top portion of each column is supported by the top support structure and the bottom portion of each column is support by the bottom support structure, and wherein the plurality of tubes are located in the bottom portion of the column and the carbon molecular sieve is located above the plurality of tubes.

17. The apparatus according to claim 16, wherein the plurality of columns are organized in pairs that form an array extending along a direction that is substantially perpendicular to the axial alignment of the plurality of columns.

\* \* \* \* \*